Nov. 16, 1965
E. J. CIABATTARI ETAL
3,218,042
AERATION APPARATUS
Filed July 19, 1961
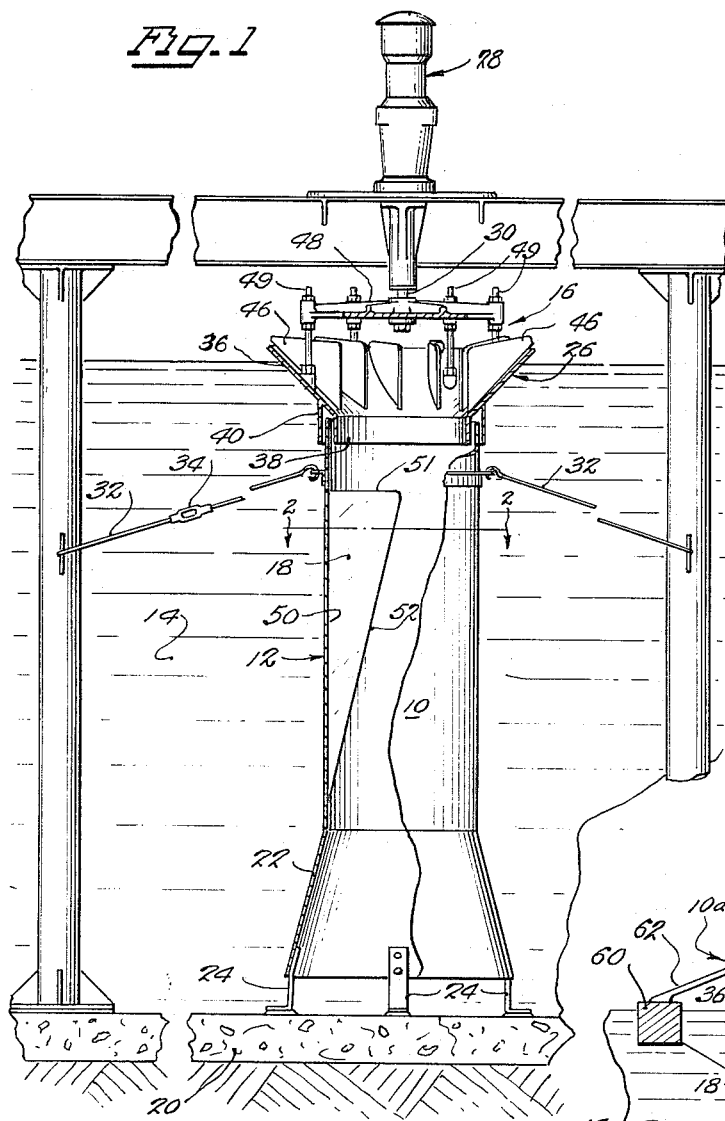
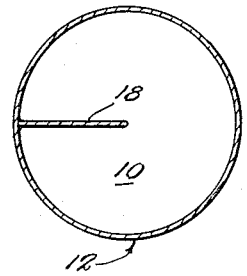
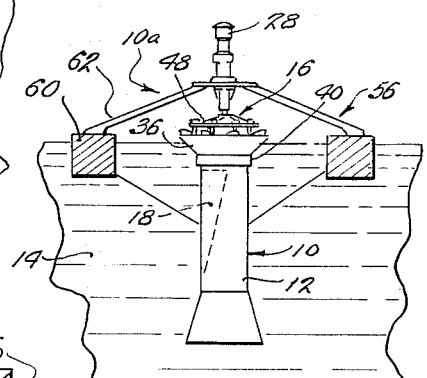
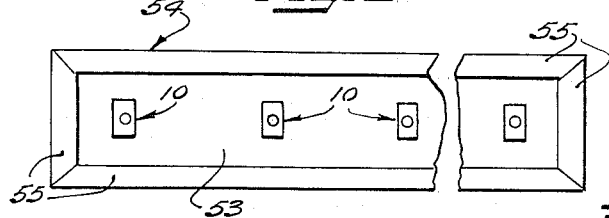
Inventors
EMIL J CIABATTARI
JOHN A ROEBER
By Soans, Anderson, Luedeka & Fitch
Attys "United States Patent Office"

3,218,042
Patented Nov. 16, 1965

3,218,042
AERATION APPARATUS
Emil J. Ciabattari, Chicago, and John A. Roeber, Downers Grove, Ill., assignors to Yeomans Brothers Company, Melrose Park, Ill., a corporation of Delaware
Filed July 19, 1961, Ser. No. 125,110
2 Claims. (Cl. 259—95)

This invention relates generally to an aeration apparatus or unit. It also relates to aeration systems and methods.

The need to treat sewage and other waste materials has produced a long succession of developments leading toward more effective and efficient apparatus, systems and methods of fulfilling this need. One such development has resulted in apparatus of the type shown in U.S. Patent No. 2,802,647 issued August 13, 1957. This type of apparatus comprises generally a draft tube that is immersed in a pond of liquid-borne waste material. The tube extends from adjacent the botom of the pond to the liquid level where a rotating aeration means in the form of a rotary cone is disposed. The operation of the rotary cone serves to draw liquid up through the tube and to mix it with air. This type of apparatus has proved very effective in a number of situations. The present invention relates to improvements in the rotary cone type of aeration apparatus, and also to novel aeration systems and methods in which this type of apparatus is particularly effective.

An object of the present invention is to provide an improved aeration apparatus for liquid which contains waste material. Another object is to provide novel aerating systems. Still another object is the provision of new methods of aeration.

A more specific object of the present invention is to provide a rotary cone type aeration apparatus or unit having baffle structure to reduce undesirable vortexing in the draft tube. Further, it is an object to provide a system and method for treating liquid-borne waste material in elongated shallow basins. It is a further object to provide a mobile aeration system and a method for treating liquid that contains waste material. Various other objects of the present invention will become obvious from the following description and the accompanying drawings, wherein:

FIGURE 1 is a side elevational view of a rotary cone type apparatus or unit embodying various features of the present invention, with parts broken away and in section to more clearly illustrate certain details;

FIGURE 2 is a plan sectional view taken generally along line 2—2 of FIG. 1;

FIGURE 3 is a pictorial view of a treatment system including a shallow basin and several units of the type shown in FIG. 1, said system embodying features of the present invention and being capable of operating in accordance with a method of the present invention; and FIGURE 4 is a side view, in outline, of an apparatus of the type shown in FIG. 1 supported on a floating barge section.

Briefly, the rotary cone treatment apparatus or unit 10, illustrated in FIGS. 1 and 2 comprises a draft tube 12 which is immersed in a body of liquid-borne waste material or liquor 14. The lower end of the tube 12 is located adjacent the lower portion of the liquor 14, while the upper end of the tube is located at about the liquid level of the liquor. An aeration means 16 rotatable about a generally vertical axis is disposed at the upper end of the tube 12, and it operates to draw liquor up through the tube 12 and to mix it with air. It has been found that placing a generally vertically disposed baffle or vane 18 within the tube 12 will serve to substantially reduce undesirable vortexing of the liquor which is being drawn up through the tube. This feature serves to appreciably increase the operating efficiency of the apparatus 10 over that of an apparatus not having a baffle.

The apparatus 10 shown in FIG. 1 is supported within an aeration tank 20 made of concrete or like material and into which the waste material liquor 14 is introduced. The tank 20 may be of any suitable configuration, its capacity being related to the size of the apparatus 10 and the amount of power available to drive the apparatus. Supported centrally of the tank 20 is a hollow recirculation or draft tube 12 having a bell shaped lower end 22 supported in spaced relation to the floor of the tank 20 by means of spaced supports 24. At the top of the draft tube 12 is an aeration means 16 comprising, generally, a cone assembly 26 driven from a motor or drive unit 28 through a shaft 30 depending downwardly from the motor 28 and connected to the cone assembly 26. The draft tube 12 is supported centrally of the tank 20 by means of stay bolts 32 whose tension may be adjusted by means of turnbuckles 34.

The liquor 14 is constantly circulated within the tank 20. As the liquor rises in the tube 12 it is subjected to the rotating action of the cone assembly 26 and, because of the design of the cone assembly 26, it flows out of that means 26 in the form of a thick stream of relatively large volume. During operation, a part of the liquor 14 may be removed from the tank 20 for treatment or inoculation of fresh liquor.

The cone assembly 26 includes a frusto-conical, upwardly expanding, vane supporting surface 36 which is provided at its base with a collar 38 and a concentric ring 40 spaced from the collar 38 and welded or otherwise secured to the vane supporting surface 36. The upper end of the draft tube 12 is received in the annular space between the collar 38 and the ring 40. Secured to the innersurface of the frusto-conical vane supporting surface 36, and extending generally radially inwardly therefrom, are a plurality of circumferentially spaced distributing vanes 46. As shown in FIG. 1, the vanes 46 are generally triangular in shape and are curved so as to provide more effective operation.

The cone assembly 26 is supported for rotation by the shaft 30 by means of a drive ring or spider 48 which is keyed to the shaft. Circumferentially spaced about the periphery of the drive ring 48 are a plurality of adjusting studs or support rods 49 which are connected to the cone assembly. Rotation of the shaft 30 serves to rotate the cone assembly 26 relative to the draft tube 12, drawing liquor 14 into the bell-shaped lower end 22 of the tube 12, up through the tube, and back into the tank 20 at about the liquid level. The liquor is thus circulated from bottom to top and also mixed with air at the surface where it is discharged from the cone assembly.

The vertically disposed baffle 18 shown in FIGS. 1 and 2 is a right angle triangular plate or vane having a long right edge 50, a short right angle edge 51, and a hypotenuse 52. The baffle plate 18 is secured along its long right angle edge 50 to the inside of the draft tube 12 and extends generally radially inwardly toward the center of the tube. The baffle 18 is positioned with its short right angle edge 51 uppermost and spaced a short distance below the upper end of the tube 12. The short right angle edge 51 extends generally horizontally and has a length approximately equal to the radius of the tube 12 so that it extends substantially to the center of the tube. The inner edge of the baffle 18, which is the hypotenuse of the triangular plate, inclines from the center of the tube (where it joins edge 51), toward the tube wall which it intersects a short distance above the bell-shaped lower end 22. Thus, a baffle is provided with an edge which increasingly intrudes into the draft tube in the direction of upward flow.

The baffle serves to substantially reduce vortexing of the liquor rising in the tube, vortexing being the swirling or spiraling action induced by the rotating vanes 46 of the cone assembly 26. This reduction in vortexing has been found to substantially increase the effectiveness and the efficiency of the unit. First, by reducing vortexing, the volume of liquor circulated per unit of power input is increased; the power of the rotating assembly 26 is directed more effectively to raising liquor up through the tube. Also, the cascading of the liquor out of the assembly is more uniform and diffused to provide more effective aeration of the liquor.

The apparatus or unit of this type provides improved results in a variety of installations. It has been found, however, that extremely effective results may be achieved by using such units in particular systems and in practicing particular methods of waste material treatment.

One such system is that shown in FIG. 3 which comprises, broadly, a plurality of aeration units 10 longitudinally spaced along an elongated shallow open basin 54 providing a shallow pond or lagoon. Heretofore, such basins have been used to treat liquid-borne waste material, but the waste material was merely allowed to remain in the basin for a long period of time. This long time period was necessary for the slow interaction of the ambient atmosphere with the surface of liquor. The time for treating material in such basins has been greatly reduced and a more effective operation achieved by disposing a plurality of aeration units in such a basin and operating them so as to rotate counter to adjacent units. While various aeration units may prove effective, particularly effective and efficient operation is obtained when rotary cone, surface aeration, type units such as described above are utilized, and the system and method will be described in connection with the use of that type unit.

Generally, the size and power of the aeration units used should be related to the size and shape of the basin or lagoon so that substantially all of the waste material liquor within the basin is circulated. In addition, the construction of the various parts of each unit should be correlated with one another and with the orientation of the unit within the basin.

The illustrated basin 54 has an elongated rectangular bottom wall 53 and sloped side walls 55 extending upwardly and outwardly from the respective edges of said bottom wall. The illustrated units 10 are supported centrally of the width of the basin 54 and generally uniformly spaced-apart longitudinally of it. Adjacent units 10 are operated so that the rotary cones thereof are rotating counter to one another. This is an important feature of this method and system, and it contributes to the improved operation which results. In addition to creating opposed currents which collide to further the interaction of the liquor agitated by adjacent units, it prevents the creation of an overall flow or current around the periphery of the basin to the detriment of circulation in the interior areas.

Each unit 10 is positioned so that the lower end 22 of the tube 12 is spaced a short distance from the bottom of the basin 54 and close enough to the bottom to provide circulation of the solids which tend to settle on the bottom. The aeration means 16 at the upper end of the tube 12 is located at approximately the liquid level within the basin to provide a pouring or cascading of liquor into a maximum area around the cone so that aeration is achieved through air travel and turbulence is created by the liquor striking the upper level of the pond. The width of the basin 54 should be sufficiently narrow so that the action of the units 10 will not leave stagnant or unaffected areas. The spacing of the first and last unit from the ends of the basin is subject to the same consideration. The spacing between adjacent units is similarly determined so as to effectively reach all areas of the basin, although the interaction of the turbulence and circulation produced between a pair of oppositely rotating units differs in some respects from the interaction between the turbulent liquor and the sides of the basin. In particular, the corners of the basin are very likely to remain stagnant and unaffected unless the end units are spaced sufficiently close to the ends of the basin.

In one embodiment, very effective results were achieved with a rectangular basin 400 feet long, 40 feet across at the bottom, and 60 feet across at the top. The liquid level in the basin was approximately 7 feet and the aeration units were spaced about 70 feet apart. Each unit was disposed within the basin with the lower end of the draft tube located about 8 inches above the bottom of the basin and with the upper edge of the frusto-conical surface extending about 2 inches above the liquid level. The inner diameter of the draft tube used was about 3 feet and the upper edge of the baffle, which was located about 1½ feet below the upper edge of the tube, extended into the tube about 1½ feet or to about the center. The baffle was about 4½ feet in height. The aeration assembly was operated at from 25 to 45 r.p.m. The use of the baffle to eliminate vortex action in the tube increased the aeration efficiency of the particular unit by about 10 percent.

Another system for treating liquid-borne waste material is illustrated in FIG. 4. FIGURE 4 shows an aeration apparatus or unit 10 secured to a floatable frame or support 56. In this manner, a mobile unit 10a is provided which may be moved about so as to treat liquor containing waste material in a variety of locations. This type of structure may be used in conjunction with a tank or basin, such as described above, and moved along a specified path at a specified rate to treat a large quantity of waste material liquor. It also may be used selectively to treat particular areas in accordance with the needs of the system. Such a mobile unit 10a may also be used in a body of water such as a lake, a river, etc., and moved about as needed. If used in a river or a stream, the unit will preferably be moved from an upstream position so as to follow the flow of the polluted water being treated and thereby continuously diminish the B.O.D. content in the stream as it approaches the mouth.

As shown in FIG. 4, the unit 10 should be supported so that the aeration means 16 is located at about the liquid level. The lower end of the draft tube 12 is desirably located only a short distance above the bottom of the liquid body being treated, however, if the apparatus is being used in a situation where the bottom of the receptacle for the liquid, such as a river bed, varies from place to place, the unit 10 should extend downwardly into the liquid so far as feasible. The tube may be constructed so that its length may be varied to adapt to the changing depth of the liquor being treated.

The floatable frame or support 56, besides adequately supporting the apparatus 10, should be spaced outwardly from the apparatus, at the liquid level, sufficiently far so as not to interfere with the aerating operation of the apparatus. This may be accomplished by various constructions, such as the rectangular ring 60 supporting the unit 10 on inwardly extending frame members 62, as shown in the drawing.

Various modification and changes may be made in the illustrated embodiments of the apparatus, systems and methods of the invention without departing from the spirit and scope of said invention. Various features of the invention are set forth in the following claims.

What is claimed is:

1. Aerating apparatus comprising a receptacle for holding a quantity of waste material liquor, an elongated draft tube circular in cross-section, open at both ends and supported centrally in said receptacle with its lower end opening a short distance from the bottom of said receptacle and its upper end opening at about the normal operating level of the liquor in the receptacle said draft tube having a substantially vertically extending wall and being generally in the form of a right cylinder, a frusto-conical member rotatably supported at the upper end of said tube for rotation relative to said tube about a generally vertical axis, a plurality of vanes secured to said frusto-conical member so that rotation of said member causes liquor to flow upwardly through said tube for mixing the liquor with air, a baffle plate disposed vertically within said circular tube intermediate the ends of said tube, said plate extending radially inwardly from the wall of said tube and providing an inner edge which progressively intrudes farther into the tube in the direction of flow of the liquor, the maxium intrusion of said plate being at the upper end of said plate whereby vortexing of liquor flowing upwardly through said tube is substantially reduced 2. A system comprising a shallow, generally rectangular, open basin adapted to receive liquid which contains waste material, a plurality of continuously operating rotary cone type aeration units each including an upright draft tube having the form of a right cylinder and extending from adjacent the floor of the basin to about the liquid level, a vane disposed within said draft tube in vertically extending relation, said vane extending radially inwardly from the side of said tube with its inner edge protruding progressively further into the tube in the direction of flow of the liquid through the tube and a rotatable aeration means supported at the upper end of said draft tube for rotation about a generally vertical axis to draw liquid up through the tube and to mix the liquid with air, said aeration units being spaced-apart longitudinally along said basin and disposed generally centered of the width of said basin, said aeration units being so spaced from one another and from the sides of said basin and adjacent units being operated to rotate in opposite directions to create circulation over substantially the entire area of the liquid in said basin and at substantially all levels of the liquid for effective treatment of the liquid.

References Cited by the Examiner

UNITED STATES PATENTS

| | | | |
|---|---|---|---|
| 1,125,814 | 1/1915 | Carlin | 259—104 X |
| 1,309,219 | 7/1919 | Ruth | 259—96 X |
| 2,126,164 | 8/1938 | Anderson | 210—63 |
| 2,138,349 | 11/1938 | Mallory | 210—63 |
| 2,148,445 | 2/1939 | Drake | 209—169 X |
| 2,271,446 | 1/1942 | Unger | 210—63 |
| 2,570,114 | 10/1951 | Green | 259—6 |
| 2,704,658 | 3/1955 | Gordon | 259—8 |
| 2,802,647 | 8/1957 | Bolton | 259—8 |
| 2,825,541 | 3/1958 | Moll et al. | 210—220 X |
| 2,827,268 | 3/1958 | Staaf. | |
| 3,033,372 | 5/1962 | Riddick | 210—220 |

FOREIGN PATENTS

| | | |
|---|---|---|
| 166,385 | 7/1921 | Great Britain. |

OTHER REFERENCES

Infilco—Activator, Bulletin 2420, a 5 page publication of the International Filter Co., about 1940, 325 W. 25th Place, Chicago Ill.

Riddick: Forced Circulation of Large Bodies of Water, Journal of the Sanitary Engineering Division, Proceedings of the American Society of Civil Engineers, July 1958, paper 1703, pp. 1703–1 to 1703–20.

MORRIS O. WOLK, *Primary Examiner.*

CARL F. KRAFT, ALEXANDER WYMAN, *Examiners.*